United States Patent [19]

Fasolino

[11] Patent Number: 4,681,496
[45] Date of Patent: Jul. 21, 1987

[54] REUSABLE AND ADJUSTABLE FASTENER FOR USE WITH POWER TOOL APPLICATOR

[76] Inventor: Gabriel V. Fasolino, 1829 NE. Stanton St., Portland, Oreg. 97212

[21] Appl. No.: 858,356

[22] Filed: May 1, 1986

Related U.S. Application Data

[63] Continuation of Ser. No. 625,622, Jun. 28, 1984, abandoned.

[51] Int. Cl.$^4$ .......................... F16B 19/00; F16B 35/02
[52] U.S. Cl. .................................... 411/361; 411/383; 411/397
[58] Field of Search ............... 411/103, 107, 360, 361, 411/282, 383, 384, 388, 389, 396, 397, 43

[56] References Cited

U.S. PATENT DOCUMENTS

| | | | |
|---|---|---|---|
| 1,373,045 | 3/1921 | Bernhard | 411/396 |
| 1,442,500 | 1/1923 | VanDyke | 411/396 |
| 3,290,982 | 12/1966 | Marschner | 411/361 |
| 3,301,298 | 1/1967 | Stover | 411/282 |
| 3,521,413 | 7/1970 | Scott et al. | 411/389 |
| 4,180,228 | 12/1979 | Snyder et al. | 411/388 |
| 4,260,005 | 4/1981 | Stencel | 411/3 |

FOREIGN PATENT DOCUMENTS 524129 5/1921 France ................................ 411/397

OTHER PUBLICATIONS

Avdel Brochure No. 7820 Feb. 1982, Huck Manufacturing Company Form No. 802-6M dated March 1983.

Primary Examiner—Gary L. Smith
Assistant Examiner—Neill Wilson
Attorney, Agent, or Firm—Eugene M. Eckelman

[57] ABSTRACT

An elongated shank has a first section with circumferential grooves arranged for anchoring engagement with a power tool. The shank also has a second section adjacent the first section with circumferential grooves. A collar is arranged to be placed on the second section and also arranged to be swaged into locking engagement therewith by a power tool. A third section at the end of the shank opposite from the first section has screw threads and this section receives a nut in threaded engagement to form a removable and adjustable abutment in association with work pieces and the collar which has been preloaded against the work piece and swaged by a power tool. The shank may be provided with a wrench engaging portion for holding it against rotation when the nut is turned. As an alternative, the collar may be provided with the wrench engaging portion.

2 Claims, 6 Drawing Figures

U.S. Patent   Jul. 21, 1987   4,681,496
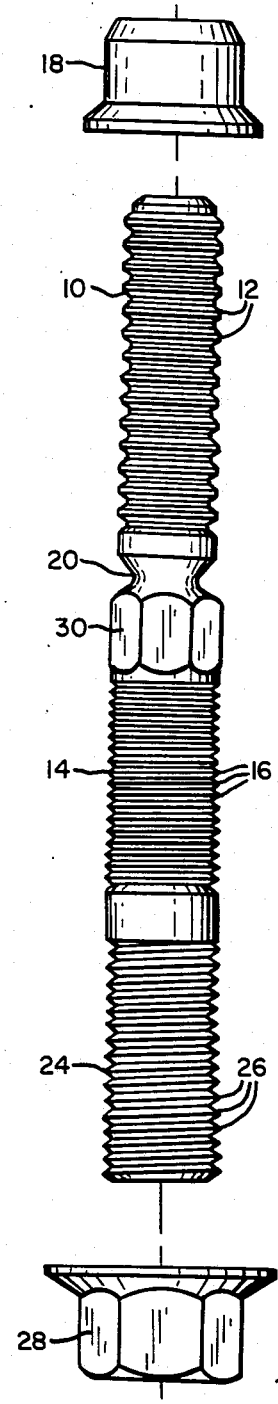
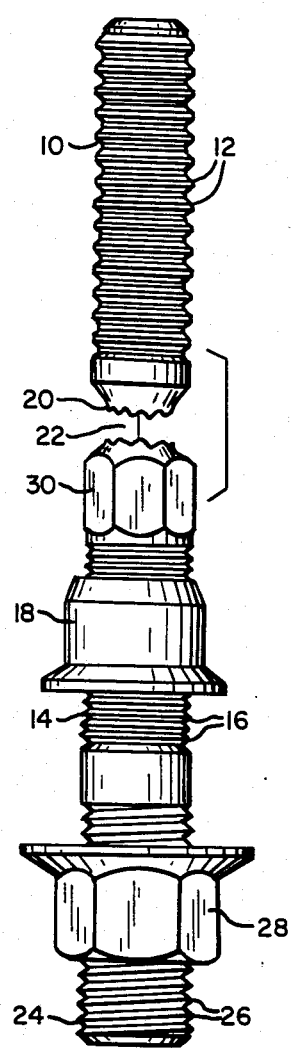
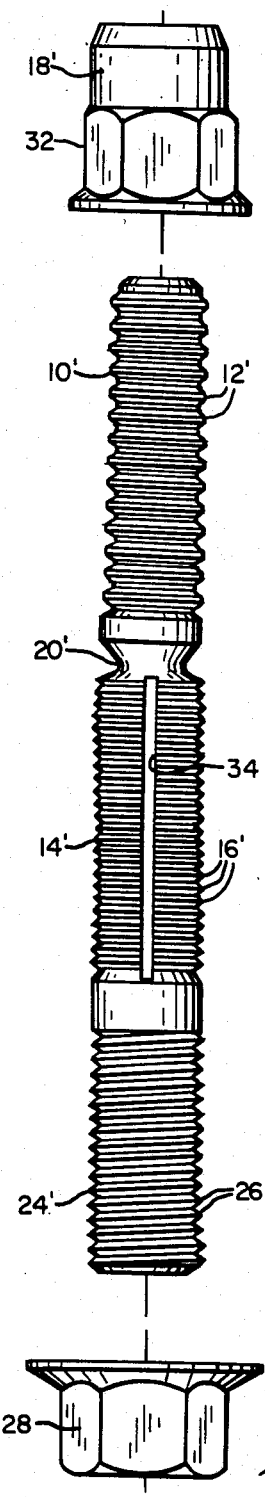
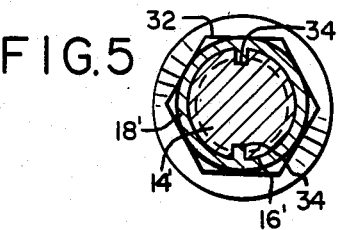
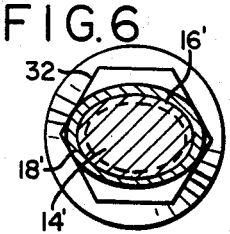
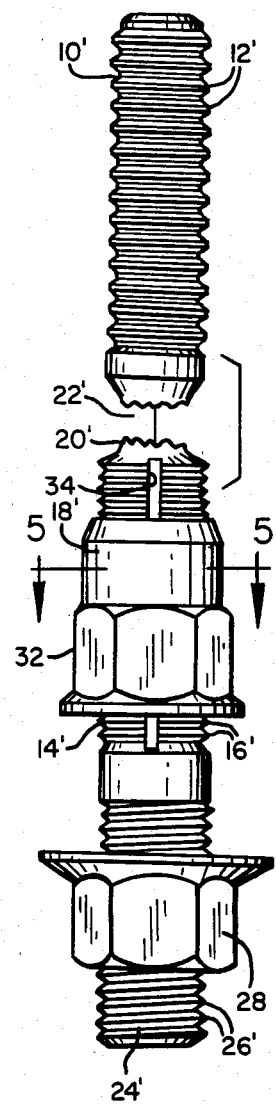

REUSABLE AND ADJUSTABLE FASTENER FOR USE WITH POWER TOOL APPLICATOR

This application is a continuation of application Ser. No. 625,622 filed June 28, 1984, now abandoned.

BACKGROUND OF THE INVENTION

This invention relates to new and useful improvements in fasteners and particularly is concerned with fasteners of the type that are installed by a power tool and with a portion thereof broken off by the tool after installation.

Fasteners, referred to as lock bolts in the trade, have heretofore been used which are installed by a special power tool. More particularly, such lock bolts include a headed shank having circumferential parallel grooves for receiving a collar to be swaged or crimped thereon and also having circumferential parallel grooves on a tail portion thereof arranged for engagement by the power tool capable of pulling parts together that are to be connected, then swaging the collar to secure it on the grooved portion, and then breaking off the tail portion of the shank. One advantage of these lock bolts is that they provide rapid assembly. Also, the clamping force can be specifically controlled and not be dependent upon the skill of a tool operator. Furthermore, these fasteners are vibration resistant and can be readily inspected to determine that a joint is properly assembled.

These prior lock bolts, however, have some disadvantages. One main disadvantage is that they are not readily removable. That is, the only manner of removing them is by shearing off the head of the shank or shearing off the collar, drilling them out, or burning them out with a torch.

Another disadvantage of lock bolts now in use is that they cannot be checked or tightened if loosening occurs in service and furthermore they are not reusable in any form.

SUMMARY OF THE INVENTION

According to the present invention and forming a primary objective thereof, a fastener is provided that accomplishes all the advantages of the lock bolt type fastener now in use and in addition has means for conveniently removing it.

Another object is to provide a fastener of the type described that can be tightened or loosened if such is required in service and also that is reusable as a bolt.

In carrying out the objectives of the invention, a fastener is provided having three sections. Two of these sections are provided with circumferential grooves, with one of the sections being arranged to be engaged in locking engagement by a collar swaged thereon and the other section being arranged to be engaged by a power tool capable of tightening the joint, swaging the collar, and breaking off the section that it engages. According to the invention, the fastener includes a threaded end opposite from the tool engaging end arranged to receive a nut such that the fastener can be removed or adjusted after installation. Also forming a part of the invention, the fastener is provided with a wrench engaging portion on the shank thereof whereby it can be held against rotation while the nut head is being removed or adjusted. In another form of the invention, the collar which is swaged in place may be provided with a wrench engaging surface for holding the fastener against rotation when the nut head is being removed or adjusted. Also, locking means may be provided between the collar and shank to anchor the collar against rotation.

The invention will be better understood and additional objects and advantages will become apparent from the following description taken in connection with the accompanying drawings.

BRIEF DESCRIPTION OF THE DRAWINGS

FIG. 1 is an elevational view of a first form of fastener of the invention prior to assembly;

FIG. 2 is an elevational view of the fastener of FIG. 1 in assembled form and also fragmented in a step which occurs during its installation;

FIG. 3 is an elevational view of another form of the invention prior to assembly;

FIG. 4 is an elevational view of the fastener of FIG. 3 in assembled form and also fragmented in a step which occur during its installation;

FIG. 5 is a section view taken on the line 5—5 of FIG. 4; and

FIG. 6 is a view similar to FIG. 5 but showing alternative structure.

DETAILED DESCRIPTION OF PREFERRED EMBODIMENTS

As hereinbefore mentioned, lock bolts used in the trade are installed by power tools and have a permanent, non-adjusting installation. These lock bolts comprise a shank having a head at one end and a plurality of circumferential grooves arranged to receive a collar which is swaged into locked engagement with the grooves by a power tool after the tool has preloaded the work pieces together. The shank also has a plurality of grooves on the tail portion thereof to which the tool obtains a grip for preloading the work and for breaking off the tail portion in a fractured disengagment. Thus, two shank sections of bolt are used, namely, a collar receiving section and a tool receiving section with a weakened fracture portion being disposed between these two sections.

With reference first to FIGS. 1 and 2, which show a first form of the invention, the fastener includes a first section 10 having a plurality of circumferential grooves 12 adapted for engagement by a power tool of conventional construction. It has a second section 14 with a plurality of circumferential grooves 16 adapted for engagement by a collar 18 having an opening therethrough allowing it to be placed on the section 14 by endwise movement on the fastener. The shank sections 10 and 14 are of conventional construction for engagement respectively by a power tool, not shown, and the collar 18, of conventional construction for preloading the work pieces, swaging the collar 18, and breaking off tail section 10. For the purpose of breaking off the section 10, the fastener has a reduced diameter portion 20 providing the fracture point 22 shown in FIG. 2.

As a feature of the invention, the fastener has a third section 24 comprising screw threads 26 adapted to receive a nut 28 which preferably is flanged as shown. Also as a feature of the invention, a hex drive portion 30, or other wrench engaging portion, is provided between the two sections 10 and 14, the portion 30 having an outer dimension which allows the collar to be moved thereover. Nut 28 comprises an anti-loosening nut which is of a well known type whereby it will not loosen by vibration. Or, in lieu of such a nut, anti-loosening agents such as plastic pads may be placed on the threads 26. In any case, such anti-loosening means holds the nut firmly in place but it can be forcefully unthreaded. In the use of the present fastener, it is installed similar to existing lock bolts by a conventional power tool. That is, the work to receive the fastener is provided with a bore and the fastener is inserted with the nut in place on the threads 26. With the collar 18 inserted onto the fastener over the end 10, the power tool is then used to obtain a grip on the grooves 12 and force the nut 28 and collar together to the desired preload. The tool then swages the body portion of the collar into a positive grip on the grooves 16. Thereupon the tool breaks off the tail section 10.

According to the invention, the present fastener can be removed if desired by forcefully unscrewing the nut 28. Also, clamping adjustment of the fastener can be varied by threaded movement of the nut, such as in case of loosening of the work parts. To allow for adjustment of nut 28, it is installed initially in an intermediate point of threads 28. The wrench engaging portion 30 can be used to hold the fastener from rotation when the nut 28 is being removed or adjusted. Since the fastener does not have to be destroyed in its removal, it can still be used as a bolt for purposes other than a use requiring installation by a power tool.

In the embodiment of FIGS. 3 and 4, the fastener also has three sections 10', 14' and 24' and these sections similarly have grooves 12' and 16' and threads 26' as in FIG. 1, including a weakened break portion 20'. Section 26' is arranged to receive a nut 28 as in FIG. 1. In this embodiment, however, the wrench engaging portion 30 is omitted but for the purpose of holding the fastener against rotation when the nut 28 is forcefully turned, the collar 18' has a hex drive portion 32, or other wrench engaging portion, as an integral part thereof. Therefore, when the collar 18' is swaged as in the embodiment of FIG. 1, it will be secured integrally to the teeth 16' and can serve as a holding element when the nut 28 is turned. If desired the portion 32 can be omitted from the swaging so as to maintain its wrench engaging shape, or such wrench engaging portion can be swaged as well. Also, a round collar in the step of being swaged can be shaped to form a wrench engaging surface.

In a preferred structure and as best seen in FIG. 5, the section 14' has one or more longitudinal grooves 34 into which material of the collar 18' is forced when the latter is swaged, whereby to positively serve as a non-rotative holding element for the fastener when the nut 28 is turned. Or, as shown in FIG. 6, the section 14' can have an out of round shape whereby the collar will be swaged to the shape and positively serve as a non-rotative holding element when the nut 28 is turned. The embodiment of FIGS. 3 and 4 has the same advantages as the first embodiment, namely, it can be readily removed, adjusted and reused.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. A fastener for clamping a pair of members together comprising:

an elongated substantially straight shank having opposite ends, first shank means at one end of said shank having circumferential grooves arranged for anchoring engagement with a power tool, second shank means adjacent said first shank means having substantially circumferential grooves, a collar arranged to be placed on said second shank means and also arranged to be swaged into axial locking and non-rotative engagement with said grooves of said second shank means by the power tool, said collar serving as a first abutment for one member to be clamped against another member, a severable area between said first and second shank means by means of which said first shank means can be separated from said second shank means by the power tool, third shank means at the end of said second shank means which is opposite from said first shank means, screw threads on said third shank means, a nut arranged for threaded engagement with said third shank means forming a removable and adjustable abutment which when in place cooperates with said collar to clamp a pair of members together from opposite sides in preloaded condition, anti-loosening means operative on said nut, and at least two flattened surfaces on said collar serving as a wrench engaging portion for holding said shank against rotation when said nut is adjusted or removed.

2. The fastener of claim 1 including locking means between said shank and collar further preventing relative rotation of said shank and collar whereby said shank is held against rotation when said nut is turned for removal or adjustment.

* * * * *